UNITED STATES PATENT OFFICE.

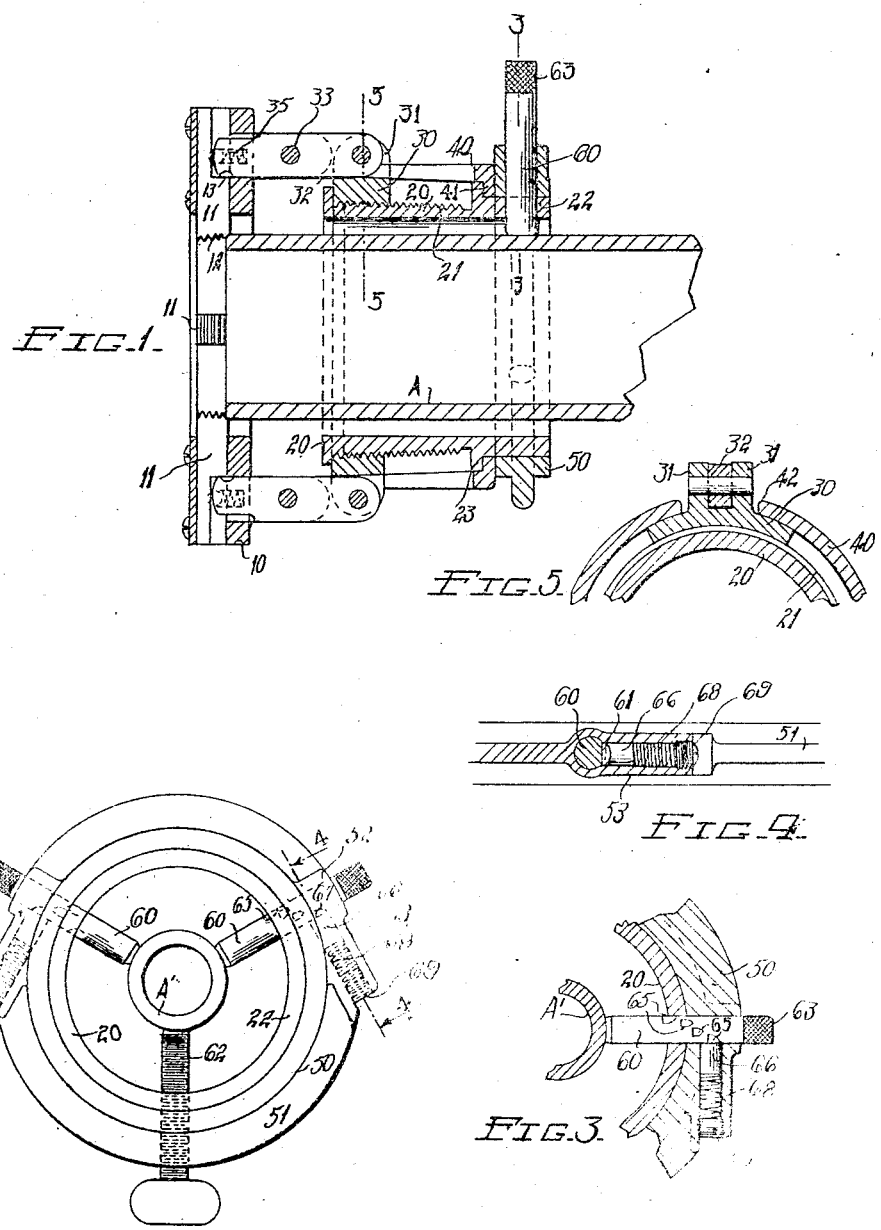

IRA W. NONNEMAN, OF WARREN, OHIO, ASSIGNOR TO THE BORDEN COMPANY, OF WARREN, OHIO, A CORPORATION OF OHIO.

CENTERING DEVICE FOR PIPE-WORKING TOOLS.

1,285,335.  Specification of Letters Patent.  Patented Nov. 19, 1918.

Original application filed January 8, 1917, Serial No. 141,122. Divided and this application filed April 4, 1917. Serial No. 159,643.

*To all whom it may concern:*

Be it known that I, IRA W. NONNEMAN, a citizen of the United States, residing at Warren, in the county of Trumbull and State of Ohio, have invented a certain new and useful Improvement in Centering Devices for Pipe-Working Tools, of which the following is a full, clear, and exact description, reference being had to the accompanying drawings.

My prior application No. 141,122, filed January 8, 1917, for a die stock, of which this is a division, shows a die stock of the receding chaser type, wherein there is a rotary chaser-carrying frame, a sleeve adapted to surround the pipe and be clamped to it, and suitable connecting mechanism between the rotary frame and the sleeve controlling the recedence of the chaser as the rotary frame approaches the sleeve. The present invention is concerned with the mechanism for clamping the stationary sleeve to the pipe. While this mechanism is shown in connection with a receding die stock and is very effective therein, it is also advantageous in other pipe working tools which are to be centered on pipes of various standard sizes. The invention is hereinafter more fully explained, and its essential characteristics set out in the claims.

In the drawings, Figure 1 is an axial section of a receding die stock equipped with my centering device; Fig. 2 is an end elevation of such die stock at the clamping end; Fig. 3 is a fragmentary section in a plane parallel with Fig. 2, as indicated by the line 3—3 on Fig. 1; Fig. 4 is a detail of the device for locking one of the centering plungers, being a cross section on the line 4—4 of Fig. 2; Fig. 5 is a fragmentary cross section on the line 5—5 of Fig. 1, illustrating the traveling threaded rider controlling the recedence of the thread-cutting chaser of the embodiment shown.

In Fig. 1, 10 indicates a suitable rotary frame carrying radial thread-cutting chasers 11. Some suitable means, as for example projecting handles (not shown) is adapted to rotate the frame. The chasers are provided at their inner ends with teeth 12 for cutting tapered threads, and as the cutting progresses they recede under the control of mechanism about to be described.

In Fig. 1, A indicates a pipe about to be threaded. Around this pipe is placed a stationary sleeve 20 which is clamped to the pipe. This sleeve is shown as having an external thread 21 of the same taper and pitch as the thread which is to be cut on the pipe. Engaging the thread 21 are suitable arcual internally threaded riders 30 which are connected with the chasers. The connection shown consists of levers 32 pivoted at their centers 33 to ears rigid with the chaser frame, these levers extending forwardly of their pivots through openings in the chaser frame and bearing against shoulders 13 on the chasers. As the chaser-carrying frame travels toward the stationary sleeve, the taper of the thread 21 allows the riders to approach the axis which allows the chasers to correspondingly recede from the axis. 35 indicates suitable spring-pressed detents preventing the chasers dropping inwardly out of the frame when the die stock is not in use.

So much of the tool as above described is not concerned specifically with the present invention and may accordingly be changed, as desired. The present invention, however, does operate effectively with the mechanism above described to clamp the sleeve 20 on the pipe, and it performs another function of holding a suitable guard over the threaded riders 30.

The sleeve 20 is shown as having an extension 22 which is cylindrical on its exterior and is separated from the threaded portion 21 by a radial flange 23. Surrounding the extension 22 is a sleeve 40 which has an inward flange 41 overhanging the flange 23 and has longitudinal slots 42 in which operate the bifurcated heads 31 of the threaded riders 30, this sleeve serving to protect the thread 21 from chips, etc. The sleeve 40 rotates on the stationary sleeve 20 and is held against longitudinal shifting thereon by the flange 23, referred to, and a collar 50 surrounding the extension 22. In the embodiment shown, my centering device performs the double purpose of effectively but removably holding the collar on the sleeve 20 and at the same time centering the stock on the pipe A.

Carried radially by the collar 50 and extending through the sleeve 20 are plungers 60, two being shown in Fig. 2, one hundred and twenty degrees apart. At a point one hundred and twenty degrees from each of these plungers is shown a set screw 62, screwing radially through the collar and the stationary sleeve. These three members are adapted to clamp the pipe, center the die stock, and lock the guide sleeve 20 thereto. As these members extend through both the collar and the sleeve 20 they necessarily lock the collar to the sleeve, and this positions the protecting sleeve 40 of the die stock.

As pipes have certain standard sizes, I make the plungers 60 adjustable by definite steps, according to such sizes, and use the set screw 62 to positively tighten the clamp on the pipe. Figs. 2 and 3 illustrate a pipe A', which may be taken as the smallest size with which the particular clamp shown is adapted to be used. The pipe A in Fig. 1 may be considered the largest size, and we may suppose that there are two intermediate sizes. To enable adjustments for such four sizes, I form four shoulders 65 in the cylindrical surface of the plungers 60. Any one of these shoulders is adapted to be engaged by a locking plunger 66, having a nose 67 and contained in a housing 53 carried by the collar 50. The locking plunger 66 is pressed toward the clamping plunger 60 by a compression spring 68 in the housing 53, the thrust of the spring being taken by a screw 69.

The plungers 60 are preferably knurled at their outer ends, as shown at 63, whereby they may be conveniently turned about their axes. When so turned the locking plunger 66 is thereby cammed backwardly, and the plunger 60 may be moved inwardly or outwardly by hand. The notches 65 are arranged in stepped relation, so that when the plunger 60 is turned slightly and moved axially the nose 67 of the locking plunger will come into the next notch 65. By positioning these notches 65 at different portions of the cylindrical surface of the plunger 60 and arranging their shoulders at proper distances from the inner ends of the plungers, they may be readily changed by a simple finger operation from one size of pipe to another.

It will be seen that my centering device is very simple in construction and readily operates to change the tool from one size of pipe to another. The centering is automatic and it is not necessary to resort to calipering or to use any special gage. The construction provides a self-contained centering device much simpler than a series of interchangeable bushings, which have heretofore been used.

I do not intend to limit myself herein to the combination of my centering device with a die stock, as it will be readily seen that it is adapted for various pipe working tools. However, my centering device has the additional advantage, when embodied in a die stock of the character shown, of holding the protecting sleeve in place. Accordingly, the claims appended hereto are intended to cover the centering device both independently of the die stock and in conjunction with the stationary and rotary sleeves of a die stock with which the centering device directly coöperates.

Having thus described my invention, what I claim is:

1. In a device of the character described, the combination with an annular holder, of a plunger radially mounted in the holder and movable therein both rotatively and longitudinally and having a set of notches positioned at different distances from its end and in offset relation, and a detent plunger having a nose adapted to engage any of said notches and lock the first mentioned plunger in position.

2. In a device of the character described, the combination with a ring, of a movable positioning plunger mounted therein and rotatable and shiftable longitudinally and having a set of notches positioned at different distances from its end and in offset relation to each other, a detent plunger having a nose adapted to engage any of said notches and lock the positioning plunger in position, a spring pressing the detent plunger toward the centering plunger, and means carried by the ring adapted to center a pipe against said plunger.

3. In a device of the character described, the combination with a holder, of a plunger mounted in the holder for rotative and axial movement therein, said plunger having notches formed in it at different distances from its end and in stepped relation, and a detent device adapted to engage any of said notches.

4. In a device of the character described, the combination with a holder, of a centering plunger mounted in the holder for rotative and axial movement therein, said plunger having notches formed in it at different distances from its end and in stepped relation, a detent device adapted to engage any of said notches, a spring for pressing said detent device toward the plunger, the detent device being adapted to be cammed back to free the plunger by reason of a rotative movement in the plunger.

5. In a device of the character described, the combination of a holder, a cylindrical plunger mounted therein and adapted to move both rotatively and longitudinally, the outer end of the plunger having a knurled portion whereby it may be readily turned, a series of notches in the cylindrical wall of the plunger positioned at different distances from its inner end and in offset relation, a lateral locking plunger having a nose adapted to engage any of said notches, and a spring forcing the lateral plunger toward the plunger first mentioned.

6. In a device of the character described, the combination of a ring, a radial plunger extending through the ring and adapted to bear against a pipe located coaxially with the ring, said plunger having notches formed at different distances from its inner end, a lateral plunger having a nose adapted to engage any of said notches or be forced outwardly by the turning of the radial plunger, and a spring pressing the lateral plunger toward active position.

7. In a device of the character described, the combination with a holding ring, of a plurality of radial plungers each having a set of notches positioned at different distances from its end, and means adapted to engage any of said notches and lock the centering plungers in position.

8. In a device of the character described, the combination with a ring, radial plungers mounted therein and each having a set of notches positioned at different distances from its end, detent plungers carried by the ring and each having a nose adapted to engage any of said notches and lock the corresponding centering plunger in position, and springs pressing the detent plungers toward the centering plungers.

9. In a centering device, the combination of a ring adapted to surround the work to be centered, a plurality of centering plungers mounted in the ring for rotative and axial movement therein, each plunger having notches formed in it at different distances from its end and in stepped relation, and detent devices carried by the ring for engaging any of said notches.

10. In a device of the character described, the combination of a ring adapted to surround a pipe, a pair of individually movable radial plungers carried by the ring, individual means for locking said plungers in various definite positions, and a screw carried by the ring and adapted to engage the pipe.

11. In a device of the character described, the combination of a ring, a pair of radial plungers mounted therein substantially one hundred twenty degrees apart, said plungers being movable radially independently of each other, means for locking them in various definite positions dependent upon various sizes of pipes, and a radial screw located substantially one hundred twenty degrees from each plunger and adapted to bear against a pipe and clamp the device tightly to it.

12. The combination of a ring, a pair of cylindrical radial plungers mounted therein at substantially one hundred twenty degrees apart, each plunger having a set of notches in its cylindrical surface, a pair of detent plungers carried by the ring and pressed against the radial plungers, and a clamping member carried by the ring substantially one hundred twenty degrees from each plunger.

In testimony whereof, I hereunto affix my signature.

IRA W. NONNEMAN.

Copies of this patent may be obtained for five cents each, by addressing the "Commissioner of Patents, Washington, D. C."